F. H. MOYER.

DEMOUNTABLE RIM.

APPLICATION FILED JAN. 11, 1915.

Reissued July 26, 1921. 15,166.

WITNESSES:

W. J. Llewellyn

Frank Oberkirch

INVENTOR.

Fredrick H. Moyer

BY

Robert W. Cathey his ATTORNEY.

UNITED STATES PATENT OFFICE.

FREDELLIA H. MOYER, OF CLEVELAND, OHIO, ASSIGNOR TO GENERAL RIM COMPANY, OF NEW YORK, N. Y.

DEMOUNTABLE RIM.

15,166. Specification of Reissued Letters Patent. Reissued July 26, 1921.

Original No. 1,116,723, dated November 10, 1914, Serial No. 832,406, filed April 17, 1914. Application for reissue filed January 11, 1915. Serial No. 1,719.

*To all whom it may concern:*

Be it known that I, FREDELLIA H. MOYER, a citizen of the United States, and a resident of the city of Cleveland, in the county of Cuyahoga and State of Ohio, have invented certain new and useful Improvements in Demountable Rims, of which the following is a reissue of Patent No. 1,116,723, patented November 10th, 1914.

The invention relates to improvements in demountable rims of that type known as split rims and has as its object the providing of a base rim section split on a diagonal plane, having mounted on its under surface, adjacent to one of the split ends thereof, a locking cleat provided with a hook adapted to engage an aperture in the opposite end beyond the split, said hook being formed at an angle greater than the split in said rim, so as to provide means for forcing the split ends into a closer positive contact when an inflated tire is mounted thereon.

Another and further object of the invention is the providing of a lever clip pivotally mounted in the split end of said rim adjacent to said aperture for locking the hook end of said cleat permanently into position in said aperture, thereby preventing the rim base from re-setting into an eccentric position, said locking lever also assisting said cleat in drawing the split ends of said rim into a close permanent position when associated with the tire of any type.

In the following is described in connection with the accompanying drawings, one embodiment of the invention the features thereof being more particularly pointed out hereinafter in the claims.

Figure 1:
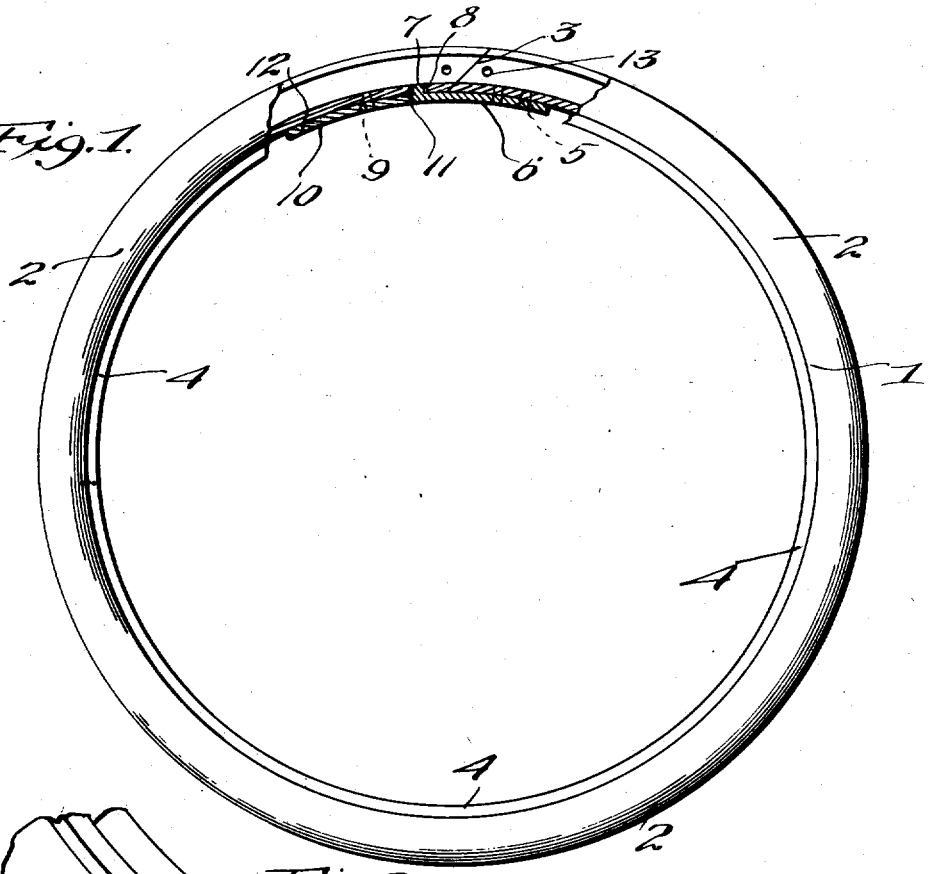
Figure 2:
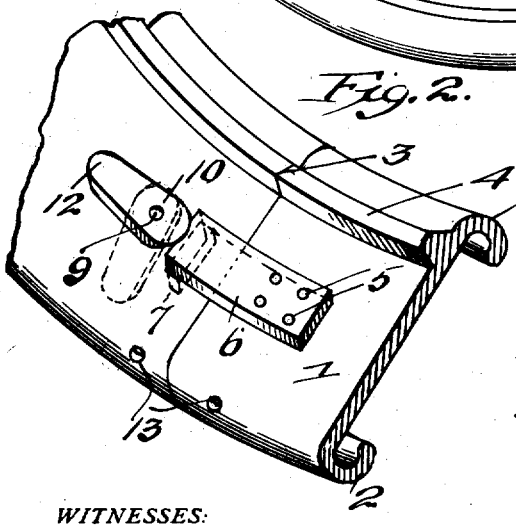
Figure 3:
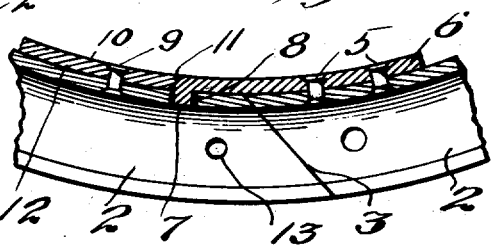

In the drawings Figure 1 is a face elevation of the rim part thereof shown in annular section to more clearly define the invention; Fig. 2 is an inverted perspective view of the rim at the split point thereof showing the locking cleat and its locking means in a set locked position, and said locking lever in an unlocked position; and Fig. 3 is an enlarged fragmentary annular sectional view of the split rim locking means.

Similar numerals of reference indicate similar parts throughout the several views.

In the drawings (1) indicates a rim base provided with clencher flanges (2) cut through or split at (3) on a predetermined diagonal plane and provided with an annular rib (4) adapted to rest on a suitable fixed rim. One end of said rim base (1) near said diagonal cut has mounted on its under surface, by means of rivets (5), a spring locking cleat (6) projecting over the cut and having formed on its end an upwardly turned hook (7), the hook portion extending more nearly in the direction of a radius of the rim than the intersection of the plane of severance of the rim with a plane perpendicular to the axis of the rim, the end of the rim base opposite the split having cut therein an aperture (8) adapted to receive said hook (7) when the rim is in its locked position. The object of having two diverse angles in the split and hook is to provide means for closing all space at the split in the rim when an inflated tire is placed into position thereon.

The end of the rim adjacent to aperture (8) has pivotally mounted on its inside surface at (9) a locking clip (10) provided with a tapered end (11) and an elongated arm portion (12) for operating same. The tapered end (11) engages the inner surface of cleat (6) at a point beneath the hook (7) and when thrown into place locks said cleat and hook into positive position thereby securely connecting the split ends of the rim base, and assists in providing substantially a solid rim of any desired type, such as the clencher base or said side base rims. Apertures (13) are provided in the split ends of said rim for use in connection with the rim tool.

The operation of the device is as follows:

When an inflated tire is to be removed from the rim, a manually controlled tool of a suitable nature is utilized for collapsing the same at a point immediately adjacent to the split by inserting lugs within apertures formed in said rim and by throwing one of the split ends into an eccentric unlocked position which releases the locking cleat (6) after the locking clip (10) is moved to an open position. The re-mounting of a tire is made by means of mounting the shoe on the rim base when the rim is in the unlocked position.

It is obvious that the invention as herein shown and described may be varied in many ways without departing from the spirit of the invention.

What I claim and desire to secure by Letters Patent of the United States is:

1. A device of the character described comprising a rim base split transversely thereof at a single point, a cleat on the underside of said base on one of its split ends, having formed thereon a hook, bent outwardly from the body thereof, an aperture cut in the opposite end of said base adapted to receive said hook, a locking clip mounted on the opposite end of said base adjacent to said aperture and adapted to engage the hook end of said cleat, said clip being adapted to hold and lock the hook end of said cleat in said aperture.

2. A device of the character described comprising a rim base split transversely thereof at a single point, having on its under surface a supporting means for said rim base, a cleat on the underside of said base on one of its split ends, having formed thereon a locking hook, bent outwardly from the body of said cleat, an aperture cut in the opposite end of said base adapted to receive said locking hook, a locking clip mounted in the opposite end of said base adjacent to said aperture and adapted to engage the hook end of said cleat, said clip being adapted to hold and lock the hook end of said cleat in said aperture, and to assist in holding the split ends of said rim base securely in circumferential alinement.

3. A device of the character described comprising a rim split transversely thereof at a single point, a tongue extending beyond one end of said rim, the other end of said rim being provided with an aperture, a projection formed on said tongue adapted to fit in said aperture, whereby separation of the rim ends is prevented, and a locking device mounted on the end of said rim adjacent the aperture, adapted to engage the tongue, said device being adapted to hold and lock the said projection in the said aperture.

4. A tire carrying rim split transversely and provided with tire engaging flanges, a rigid tongue extending beyond one end of the split rim, means on the other end of said rim with which said tongue is adapted to engage, and a locking device mounted on said last named end of the rim and movable into and out of engagement with said tongue.

5. A tire carrying rim split transversely thereof and provided with integral tire engaging flanges, a rigid tongue on one end of said rim adapted to overlie the other end, the other end of said rim having a part adapted to engage with said tongue to prevent separation of the ends of the rim at the split, and a movable device independent of said tongue mounted on the last named end of the rim for holding said tongue in engagement with said part.

6. A tire carrying rim split transversely and having integral tire engaging flanges, a tongue rigidly mounted on said rim and extending beyond one end thereof and adapted to overlie the other end of the rim, and a member independent of the tongue permanently mounted on said last named end of the rim for engaging with said tongue to prevent relative movement between the adjacent ends of the rim.

In testimony whereof I have hereunto signed my name in the presence of two subscribing witnesses.

FREDELLIA H. MOYER.

Witnesses:

W. J. LLEWELLYN,

JOHN PRIBIC.